E. H. RICHTER.
Apparatus for Granulating Zinc.
No. 145,449.            Patented Dec. 9, 1873.
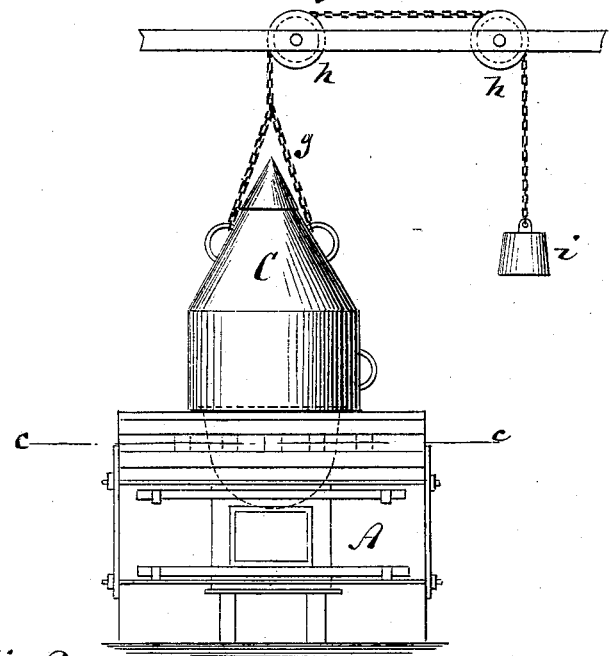
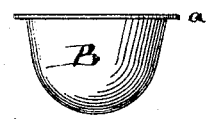
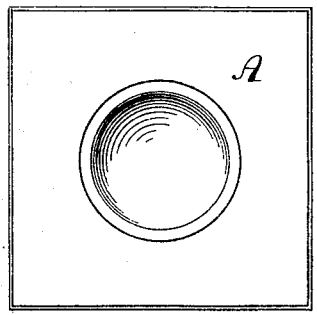
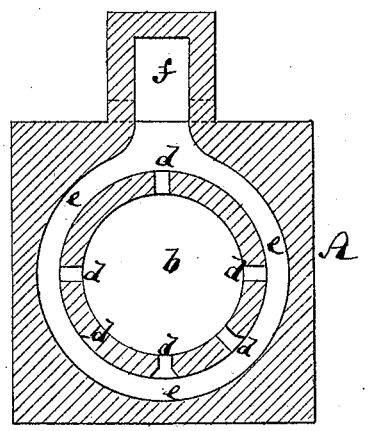

UNITED STATES PATENT OFFICE.

ERNST H. RICHTER, OF TAUNTON, MASSACHUSETTS.

IMPROVEMENT IN APPARATUS FOR GRANULATING ZINC.

Specification forming part of Letters Patent No. 145,449, dated December 9, 1873; application filed August 21, 1873.

*To all whom it may concern:*

Be it known that I, ERNST H. RICHTER, of Taunton, in the county of Bristol and State of Massachusetts, have invented an Improved Apparatus for Granulating Zinc, of which the following is a specification:

Figure 1 is a side view of my improved apparatus for granulating zinc. Fig. 2 is a detail side view of the kettle or boiler used therein; Fig. 3, a top view of the apparatus without the cover; and Fig. 4, a horizontal section thereof on the line $c$ $c$, Fig. 1.

Similar letters of reference indicate corresponding parts.

This invention relates to improvements on the ordinary apparatus for granulating zinc; with the object of providing means for retaining the heat in the pan that contains the scrap zinc which is to be granulated, and for preventing the escape of the zinc-fumes from such pan. My invention consists in providing a vertically-adjustable cap or cover which can be placed over the pan or kettle containing the scrap zinc, to close the same hermetically and still permit the development of the fumes and gases, and which detains the heat and the fumes, and thereby, inasmuch as it prevents the rapid cooling off, hastens the process of melting and subsequent granulation.

In the accompanying drawing, the letter A represents the lower part of a heating apparatus, which is constructed to support a pan or kettle, B, in substantially the customary manner. The kettle B is suspended by its top flange $a$ from the upper part of the structure A, so as to hang over the fire-place $b$ in the latter. From this fire-place smoke-passages $d$ $d$ extend in all directions into an annular smoke-chamber, $e$, which communicates with the smoke-stack $f$, as shown in Fig. 4, all of which, however, is not my invention, but well known. C is a cap or cover, made of metal, hollow, and of such size and shape as to embrace the mouth of the kettle B when placed over the same, in the manner shown in Fig. 1. This cap or cover is, by preference, made of partly conical, partly cylindrical, form, as shown, to constitute a hood of sufficient size for permitting the accumulation of the gases therein. It is desirable and important so to form the hood that the gases ascending from the kettle and their heat will be temporarily detained, and pressure in the kettle at the same time avoided. For this reason the hood is of considerable size, and has also a vent at the upper part beneath the projecting top cone, shown in Fig. 1. The hood or cover C is, by a chain, $g$, which passes over the rollers $h$ $h$, connected with a weight, $i$, that balances it, and that permits it to be readily lifted from above the mouth of the kettle B. While the former is used beneath the kettle, and the latter filled with zinc or scrap zinc, the cover C is let down over the kettle, so as to make together with the same one chamber, within which the fumes of the heated zinc and the heat applied to the zinc are confined.

In the ordinary process of melting scrap zinc, the rapid cooling of the surface thereof has been found very inconvenient, and this inconvenience is entirely overcome by the application of the cap C, which keeps the contents of the kettle always in condition for removal for granulation, and also economizes fuel by retaining the heat. Whenever it is desired to remove this molten matter from the kettle, the cover C is readily lifted to admit the operator to the contents of the pan.

I claim as my invention—

The suspended hood C, having a vent at the upper part, and placed above and combined with an apparatus for melting scrap zinc, substantially as and for the purpose described.

ERNST H. RICHTER.

Witnesses:
G. E. WILLIAMS,
FRIEDRICH GUSTAV RICHTER.